US008511652B2

(12) United States Patent
Moulik et al.

(10) Patent No.: US 8,511,652 B2
(45) Date of Patent: Aug. 20, 2013

(54) GAS SPRING AND GAS DAMPER ASSEMBLY AND METHOD

(75) Inventors: Pradipta N. Moulik, Carmel, IN (US); Graham R. Brookes, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 95 days.

(21) Appl. No.: 13/003,234

(22) PCT Filed: Jul. 9, 2009

(86) PCT No.: PCT/US2009/050090
§ 371 (c)(1),
(2), (4) Date: Jan. 7, 2011

(87) PCT Pub. No.: WO2010/006159
PCT Pub. Date: Jan. 14, 2010

(65) Prior Publication Data
US 2011/0115139 A1  May 19, 2011

Related U.S. Application Data

(60) Provisional application No. 61/079,276, filed on Jul. 9, 2008.

(51) Int. Cl.
*F16F 9/05* (2006.01)
(52) U.S. Cl.
USPC .............. 267/64.21; 267/64.24; 267/64.25; 267/64.27; 267/122
(58) Field of Classification Search
USPC .......... 267/64.19, 64.21, 64.23, 64.24, 64.25, 267/64.27, 122; 280/124.157, 124.16
See application file for complete search history.

(56) References Cited

U.S. PATENT DOCUMENTS

| | | | |
|---|---|---|---|
| 2,773,686 | A | 12/1956 | Nash |
| 3,046,003 | A | 7/1962 | Schultz |
| 3,168,278 | A | 2/1965 | Ogden |
| 3,374,981 | A | 3/1968 | Stuckenberger et al. |
| 3,730,473 | A | 5/1973 | Pepi |
| 3,889,936 | A | 6/1975 | Shimizu |
| 3,915,421 | A | 10/1975 | Le Forestier |

(Continued)

FOREIGN PATENT DOCUMENTS

| | | |
|---|---|---|
| DE | 24 06 835 | 8/1975 |
| DE | 34 42 497 A1 | 5/1986 |

(Continued)

OTHER PUBLICATIONS

"High Purity Porous Metal Flow Restrictors," Mott Corporation catalog, Farmington, Connecticut, USA.

(Continued)

*Primary Examiner* — Thomas J Williams
(74) *Attorney, Agent, or Firm* — Jason A. Houser; Fay Sharpe LLP

(57) ABSTRACT

A gas spring and gas clamper assembly includes a first end member, a second end member, a first flexible wall that at least partially defines a first spring chamber, and a second flexible wall that at least partially defines a second spring chamber. A damper piston and damper rod are operatively connected between the first and second end members and within the first spring chamber. A suspension system that includes a gas spring and gas damper assembly as well as a method of assembly are also included.

18 Claims, 3 Drawing Sheets

(56) References Cited

U.S. PATENT DOCUMENTS

| | | | |
|---|---|---|---|
| 3,989,232 A | | 11/1976 | Steinbach et al. |
| 4,325,541 A | | 4/1982 | Korosladanyi et al. |
| 4,493,481 A | | 1/1985 | Merkle |
| 4,518,154 A | | 5/1985 | Merkle |
| 4,629,170 A | | 12/1986 | Warmuth, II |
| 4,635,909 A | | 1/1987 | Gold |
| 4,647,025 A | * | 3/1987 | Gold ............ 267/64.27 |
| 4,669,710 A | | 6/1987 | Horvat |
| 4,697,797 A | | 10/1987 | Gold |
| 4,742,996 A | * | 5/1988 | Gold ............ 267/64.24 |
| 4,743,000 A | | 5/1988 | Karnopp |
| 4,854,555 A | | 8/1989 | Ohkawa et al. |
| 4,877,223 A | * | 10/1989 | Hackett ............ 267/64.19 |
| 4,934,667 A | * | 6/1990 | Pees et al. ............ 267/64.21 |
| 5,042,784 A | | 8/1991 | Murai et al. |
| 5,067,684 A | | 11/1991 | Garnjost |
| 5,071,108 A | | 12/1991 | Houghton, Jr. |
| 5,129,634 A | | 7/1992 | Harris |
| 5,169,129 A | | 12/1992 | Hoffman |
| 5,234,203 A | | 8/1993 | Smith |
| 5,285,995 A | | 2/1994 | Gonzalez et al. |
| 5,316,273 A | | 5/1994 | Vaphiadis |
| 5,379,980 A | | 1/1995 | Houghton, Jr. et al. |
| 5,382,006 A | | 1/1995 | Arnold |
| 5,628,496 A | | 5/1997 | Chamberlin |
| 5,669,597 A | * | 9/1997 | Rittstieg et al. ............ 267/64.21 |
| 5,797,593 A | | 8/1998 | Oyaizu |
| 5,918,862 A | | 7/1999 | Nelson |
| 5,954,316 A | | 9/1999 | Voss |
| 5,996,980 A | | 12/1999 | Frey et al. |
| 6,089,552 A | | 7/2000 | Pahl |
| 6,161,662 A | * | 12/2000 | Johnston et al. ............ 188/282.3 |
| 6,402,128 B1 | | 6/2002 | Trowbridge |
| 6,508,460 B2 | | 1/2003 | Job |
| 6,547,224 B2 | | 4/2003 | Jensen et al. |
| 6,547,225 B1 | | 4/2003 | Nelson |
| 6,561,500 B2 | | 5/2003 | Schisler et al. |
| 6,691,989 B1 | | 2/2004 | Leonard |
| 6,782,979 B1 | | 8/2004 | Gold et al. |
| 6,926,263 B1 | | 8/2005 | Nelson |
| 7,104,547 B2 | | 9/2006 | Brookes et al. |
| 7,150,451 B2 | | 12/2006 | Soles et al. |
| 7,213,799 B2 | * | 5/2007 | Behmenburg et al. ..... 267/64.24 |
| 7,487,957 B2 | | 2/2009 | Brunneke et al. |
| 7,644,943 B2 | | 1/2010 | Hayes et al. |
| 7,802,776 B2 | | 9/2010 | Behmenburg et al. |
| 7,832,747 B2 | | 11/2010 | Siebeneick |
| 7,866,681 B1 | | 1/2011 | Shahly |
| 7,886,882 B2 | | 2/2011 | Behmenburg et al. |
| 8,002,250 B2 | | 8/2011 | Hujer et al. |
| 8,025,272 B2 | | 9/2011 | Schallmeier |
| 8,215,620 B2 | | 7/2012 | Krauss |
| 2002/0148692 A1 | * | 10/2002 | Jensen et al. ............ 188/313 |
| 2003/0173723 A1 | | 9/2003 | Behmenburg et al. |
| 2004/0119250 A1 | | 6/2004 | Rehra et al. |
| 2004/0124571 A1 | | 7/2004 | Gold et al. |
| 2004/0130079 A1 | | 7/2004 | Gold et al. |
| 2004/0201146 A1 | | 10/2004 | Behmenburg et al. |
| 2005/0236781 A1 | * | 10/2005 | Brookes et al. ............ 280/5.507 |
| 2006/0207846 A1 | | 9/2006 | Krauss |
| 2007/0114706 A1 | * | 5/2007 | Myers ............ 267/64.27 |
| 2007/0126163 A1 | | 6/2007 | Leonard et al. |
| 2008/0290571 A1 | | 11/2008 | Krauss |
| 2009/0200718 A1 | | 8/2009 | Roemer et al. |
| 2010/0096786 A1 | | 4/2010 | Orlamünder et al. |
| 2011/0115139 A1 | | 5/2011 | Moulik et al. |
| 2011/0115140 A1 | * | 5/2011 | Moulik et al. ............ 267/64.23 |

FOREIGN PATENT DOCUMENTS

| | | | |
|---|---|---|---|
| DE | 36 41 623 A | | 6/1987 |
| DE | 38 24 932 C1 | | 1/1990 |
| DE | 3824932 C1 | | 1/1990 |
| DE | 3934821 A1 | * | 4/1991 |
| DE | 44 01 770 A1 | | 8/1995 |
| DE | 4401770 | | 8/1995 |
| DE | 4401770 A1 | * | 8/1995 |
| DE | 10353877 A1 | * | 6/2004 |
| DE | 100 27 369 B4 | | 7/2004 |
| DE | 10 2004 060002 A1 | | 6/2006 |
| DE | 10 2005 045 251 A1 | | 3/2007 |
| EP | 1 429 045 A2 | | 6/2004 |
| EP | 1 464 865 B1 | | 10/2005 |
| EP | 1 457 362 B1 | | 10/2006 |
| EP | 1 715 213 A1 | | 10/2006 |
| EP | 1 895 185 A2 | | 3/2008 |
| EP | 1 947 360 A1 | | 7/2008 |
| EP | 1 464 866 B1 | | 7/2009 |
| EP | 1 715 215 B1 | | 10/2009 |
| JP | 2 037010 A | | 2/1990 |
| WO | WO 01/01012 A1 | | 1/2001 |
| WO | WO 02/22385 A1 | | 3/2002 |
| WO | WO 2006/071172 A1 | | 7/2006 |
| WO | WO 2009/124743 A1 | | 10/2009 |

OTHER PUBLICATIONS

Supplemental European Search Report.
International Search Report.

\* cited by examiner

GAS SPRING AND GAS DAMPER ASSEMBLY AND METHOD

This application claims the benefit of priority from U.S. Provisional Patent Application No. 61/079,276 filed on Jul. 9, 2008, the subject matter of which is hereby incorporated herein by reference in its entirety.

BACKGROUND

The present disclosure broadly relates to the art of spring devices and, more particularly, to a gas spring and gas damper assembly that includes a dual-chambered gas spring used in combination with a gas damper, as well as a vehicle suspension system and a method of operating such a gas spring and gas damper assembly.

Suspension systems, such as may be used in connection with motorized vehicles, for example, typically include one or more spring elements for accommodating forces and loads associated with the operation and use of the corresponding system or device (e.g., a motorized vehicle). In such applications it is often considered desirable to select spring elements that have the lowest suitable spring rate, as this can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., softer, more-compliant springs) will transmit a lesser amount of the inputs to the sprung mass. In many cases, this will be considered a desirable affect on the sprung mass, such as by providing a more comfortable ride, for example.

Such suspension systems also commonly include one or more dampers or damping elements that are operative to dissipate undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. In other arrangements, however, the damping element can be of a type and kind that utilizes gaseous fluid rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Patent Application Publication No. 2003/0173723. Generally, there is some resistance to the movement of pressurized gas through these passages or ports, and this resistance acts to dissipate energy associated with the gas spring portion and thereby provide some measure of damping.

One difficulty with known gas spring and gas damper assemblies involves balancing spring rate with damping performance. It is generally understood that increased damping performance can be achieved by operating a gas damper at an increased internal gas pressure. However, this increased gas pressure can, in some cases, have an undesirable affect on the spring rate of the gas spring, such as by undesirably increasing the spring rate in applications in which a lower spring rate is desired, for example.

Another difficulty with known gas spring and gas damper assemblies is that the flexible wall used to form the gas spring portion thereof can be undesirable effected when operated for extended durations at elevated gas pressure levels. As such, it is generally believe desirable to operate known gas spring and gas damper assemblies at lower nominal operating pressures to avoid such undesirable effects. However, operating the gas spring and gas damper assembly at such reduced gas pressures also results in lower damping performance.

Accordingly, it is desired to develop a gas spring and gas damper assembly as well as a suspension system and method using the same that overcome the foregoing and other difficulties associated with known constructions.

BRIEF DESCRIPTION

One example of a gas spring and gas damper assembly in accordance with the subject matter of the present disclosure can include a first end member and a second end member that is disposed in longitudinally-spaced relation to the first end member. The second end member includes an inner side wall and an outer side wall. The inner side wall at least partially defines an inner cavity. The assembly also includes a gas damper piston that is at least partially received within the inner cavity. The gas damper piston slidably engages the inner side wall and is adapted for longitudinal displacement therealong. The assembly further includes a gas damper connector rod that operatively connects the first end member and the gas damper piston such that relative longitudinal displacement between the first and second end members results in displacement of the gas damper piston along the inner side wall within the inner cavity. The assembly also includes a first flexible sleeve that is operatively connected between the first and second end members at least partially defining a first spring chamber therebetween. The first spring chamber at least partially contains the gas damper piston and the gas damper connector rod. The assembly also includes a second flexible sleeve that is disposed radially-outwardly along the first flexible sleeve and is operatively connected between the first and second end members such that a second spring chamber is formed radially-outwardly of the first spring chamber along the first flexible sleeve.

One example of a suspension system in accordance with the subject matter of the present disclosure can include a gas spring and gas damper assembly according to the foregoing paragraph and a pressurized gas system. The pressurized gas system includes a pressurized gas source in fluid communication with at least one of said first and second spring chambers of said gas spring and gas damper assembly.

One example of a method of operating a gas spring and gas damper in accordance with the subject matter of the present disclosure can include providing a first end member and a second end member with the first end member including a side wall at least partially defining an end member cavity. The method can also include forming a gas damper from a damper piston received within the end member cavity by operatively connecting the damper piston to the second end member such that relative displacement of the first and second end members results in displacement of the damper piston within the end member cavity along the first side wall. The method can further include forming a first spring chamber about the damper from a first flexible wall secured along the first and second end members and pressurizing the first spring chamber to a first pressure. The method can also include forming a second spring chamber about the first flexible wall from a second flexible wall secured along the first and second end members and pressurizing the second spring chamber to a second pressure that is less than the first pressure.

DETAILED DESCRIPTION

Figure 1:
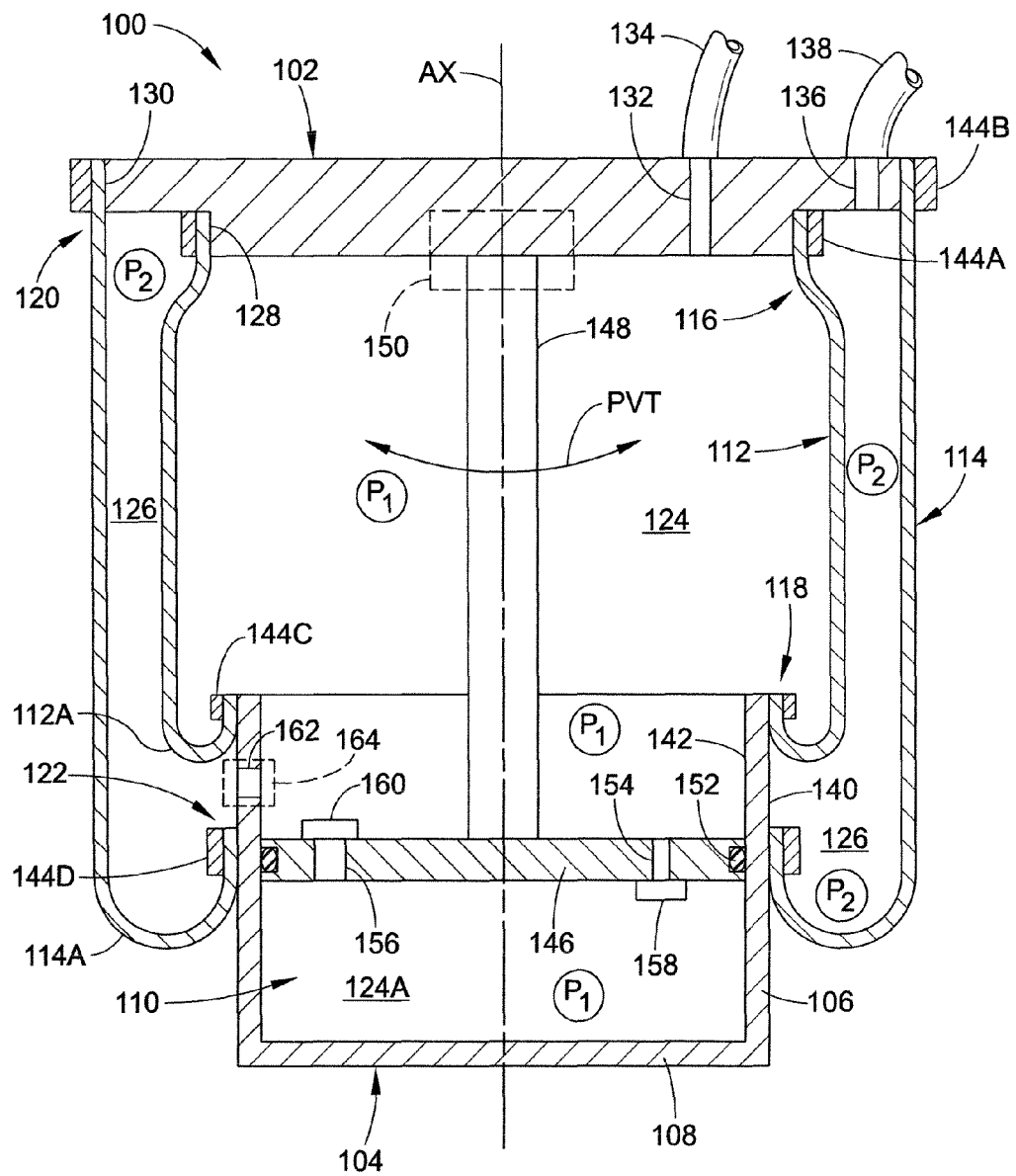
FIG. 1 is a schematic representation of one example of a gas spring and gas damper assembly in accordance with the subject matter of the present disclosure.

Turning now to the drawings, wherein the showings are for the purpose of illustrating exemplary embodiments of the present novel concept only and not for the purposes of limiting the same, FIG. 1 illustrates a gas spring and gas damper assembly 100 that includes a first or upper end member 102 and a second or lower end member 104 disposed in longitudinally-spaced relation to the first end member. Assembly 100 also includes a longitudinally-extending axis AX that extends generally between first and second end members 102 and 104. Second end member 104 includes a side wall 106 and an end wall 108 that at least partially define an end member cavity 110 within second end member 104.

Assembly 100 also includes a first or inner flexible wall 112 and a second or outer flexible wall 114, respectively. Inner flexible wall 112 is disposed circumferentially about axis AX and extends longitudinally between a first or upper end 116 and a second or lower end 118. Similarly, outer flexible wall 114 is disposed circumferentially about axis AX and extends longitudinally between a first or upper end 120 and a second or lower end 122. First end 116 of inner flexible wall 112 is operatively connected along first end member 102 and second end 118 of the inner flexible wall is secured along second end member 104 such that a first or inner spring chamber 124 is at least partially defined between the first and second end members by inner flexible wall 112. Additionally, first end 120 of outer flexible wall 114 is secured along first end member 102 and second end 122 of the outer flexible wall is secured along second end member 104 such that a second or outer spring chamber 126 is at least partially defined between the first and second end members by outer flexible wall 114.

It will be appreciated that first end member 102 and second end member 104 can be of any suitable type, kind, configuration, arrangement and/or construction. In the exemplary embodiment shown in FIG. 1, first end member 102 is of a single or unitary construction and includes at least one side wall along which an end of a flexible wall is secured. Such an end member may be referred to in the art as a top plate or cap. First end member 102 differs from conventional top plates in that first end member 102 includes a first or inner side wall 128 and a second or outer side wall 130 that is spaced radially-outwardly from the inner side wall. First end member 102 is also shown as including a first passage 132 that extends through the first end member and is suitable for fluidically interconnecting inner spring chamber 124 with an external atmosphere (e.g., such as by way of a vent or exhaust) or pressurized gas system (e.g., an air compressor, a compressed air reservoir, a valve assembly or other device), such as by way of a gas transfer line 134 that is operatively connected to the first end member, for example. First end member 102 can also optionally include a second passage 136 that extends through the first end member and is suitable for fluidically interconnecting outer spring chamber 126 with an external atmosphere or pressurized gas system or device, such as by way of a gas transfer line 138, for example. Additionally, it will be appreciated that any other suitable fittings, connectors and/or flow control devices (e.g., valves) can optionally be included.

Second end member 104, which is sometimes referred to in the art as a piston, is shown in FIG. 1 as including side wall 106 that extends longitudinally toward first end member 102 from along end wall 108. An outer surface 140 of side wall 106 is shown in FIG. 1 as being substantially cylindrical. However, it will be appreciated that the outer surface or outer profile of the second end member can be of any suitable size, shape and/or configuration, such as cylindrical, frustoconical, curvilinear or any combination thereof, for example. Side wall 106 also includes an inner surface 142 that at least partially defines end member cavity 110. In one preferred arrangement, inner surface 142 will be substantially cylindrical along the longitudinal length thereof.

Furthermore, inner flexible wall 112 and outer flexible wall 114 can be of any suitable kind, type, configuration, arrangement and/or construction. In the exemplary arrangement shown, the inner and outer flexible walls are both elongated flexible sleeves or bellows of a suitable construction. However, one or more convoluted bellow-type flexible walls could alternately, or additionally, be used. One example of a suitable construction for inner and/or outer walls 112 and/or 114 can include one or more layers of elastomeric material (e.g., rubber or thermoplastic elastomer) and can optionally include one or more fabric plies (e.g., plies of cotton, nylon or aramid fibers) or any other reinforcing elements, materials and/or components.

Also, it will be appreciated that the inner and outer flexible walls can be secured on or along the first and second end members in any suitable manner. For example, first ends 116 and 120 of inner and outer flexible walls 112 and 114, respectively, are received along inner and outer side walls 128 and 130, respectively, of first end member 102 and secured thereto using retaining rings 144A and 144B. However, it will be appreciated that any other suitable arrangement could alternately be used. As one example of an alternate construction, two bead plates could be used with the first bead plate being an inner bead plate crimped along a bead wire embedded within the first end of the inner flexible wall. The second bead plate could then be crimped along a bead wire embedded within the first end of the outer flexible wall. The first and second bead plates could then be secured to one another in any suitable manner.

Additionally, second ends 118 and 122 of inner and outer flexible walls 112 and 114, respectively, can be secured along second end member 104 in any suitable manner. For example, second ends 118 and 122 are shown in FIG. 1 as being disposed along outer surface 140 of side wall 106 and secured thereto using retaining rings 144C and 144D, respectively. While outer surface 140 of side wall 106 is shown in FIG. 1 as being substantially cylindrical, it will be appreciated that, in practice, one or more features (e.g., steps, notches, grooves, shoulders) may be provided for maintaining the ends of the flexible walls in the desired position along the side wall. Regardless of the manner in which the second ends of the inner and outer flexible walls are secured along second end member 104, inner and outer flexible walls 112 and 114 are each shown as forming a rolling lobe, which are indicated respectively by reference numbers 112A and 114A, that rolls or is otherwise displaced along outer surface 140 of side wall 106 as the first and second end members are longitudinally displaced relative to one another.

Gas spring and gas damper assembly 100 is also shown in FIG. 1 as including a damper piston 146 that is received within end member cavity 110 for longitudinal displacement along inner surface 142 of side wall 106. As such, inner spring chamber 124, which is otherwise fluidically interconnected with end member cavity 110, is separated into a main inner spring chamber, which is identified by reference number 124, along one side of damper piston 146 and a secondary inner spring chamber 124A formed within end member cavity 110 along the opposing side of damper piston 146 from the main inner spring chamber. A damper rod 148 operatively connects damper piston 146 to first end member 102 such that displacement of first and second end members 102 and 104 relative to one another will generate or otherwise result in movement of damper piston 146 within end member cavity 110. Such movement of damper piston 146 can operate to dissipate kinetic energy acting on assembly 100 and, thus, damp vibrations and other inputs, as is understood by those of skill in the art.

It will be appreciated that the interconnection between damper rod 148 and first end member 102 can be made in any suitable manner and by way of any suitable connection and/or arrangement. For example, damper rod 148 is shown in FIG. 1 as being rigidly connected to first end member 102, such as might be accomplished by a flowed-metal joint (e.g., a weld) or a threaded fastener connection, for example. As another example, a connection suitable for permitting pivotal movement or other angular displacement, represented by arrow PVT in FIG. 1, of the damping rod relative to the first end member can optionally be used. Such a connection is schematically represented in FIG. 1 by dashed box 150. Examples of connections that would permit pivotal movement could include ball and socket joints, spherical bearings and/or universal joints. It will be appreciated, however, that such a connection can be of any suitable type, kind, arrangement, configuration and/or construction.

In the present exemplary arrangement, assembly 100 acts to damp kinetic energy by allowing gas to flow between main inner spring chamber 124 and secondary inner spring chamber 124A as damper piston 146 is displaced along inner surface 142 of side wall 106. It will be appreciated that such a flow of gas can be provided for in any suitable manner, such as by providing a gap between the outer peripheral edge of the damper piston and the inner surface of the side wall and allowing gas to flow through the gap as the damper piston is displaced. An alternative arrangement is shown in FIG. 1 in which damper piston 146 includes a suitable sealing member 152 for forming a substantially fluid-tight seal between the damper piston and the inner surface of the side wall. Damper piston 146 also includes one or more passages formed therethrough that permit gas to flow between the main and secondary inner spring chambers as the damper piston is displaced. In the exemplary arrangement shown, damper piston 146 includes a first passage 154 and an optional second passage 156.

In some cases it is desirable for the damper piston to provide different damping performance and/or output in one direction of movement than is provided in the opposite direction of movement. As such, first passage 154 can include a first property or characteristic (e.g., size, shape, configuration, direction of gas flow) operatively associated with a first direction of travel. Additionally, optional second passage 156, if provided, can include a second property or characteristic (e.g., size, shape, configuration, direction of gas flow) that may be different from that of first passage 154 such that different damping performance can be provided in each direction of travel of damper piston 146. As one example, such different properties and/or performance characteristics of passages 154 and 156 could be provided by optional valves 158 and 160 that are schematically represented in FIG. 1 as being provided along the first and second passages, respectively.

As discussed above, it will be appreciated that, in the broadest sense, gas spring and gas damper assemblies are known and have been proposed for use in a variety of applications and/or operating environments. Additionally, it is generally understood that increased damping performance can be achieved from a gas damper by operating the same at an increased internal gas pressure. That is, damping performance increases as the gas pressure within the damper is increased. It has also been recognized, however, that known gas spring and gas damper assemblies may suffer undesirable effects due to extended operation thereof at elevated gas pressures, which would otherwise provide improved damping performance. As such, known gas spring and gas damper assemblies generally operate at lower nominal operating pressures, which undesirably results in lower damping performance. However, a gas spring and gas damper assembly in accordance with the subject matter of the present disclosure, such as assembly 100, for example, differs from known constructions in that substantially higher gas pressures can be used within the subject gas spring and gas damper assembly, which results in substantially improved damping performance.

Figure 2:
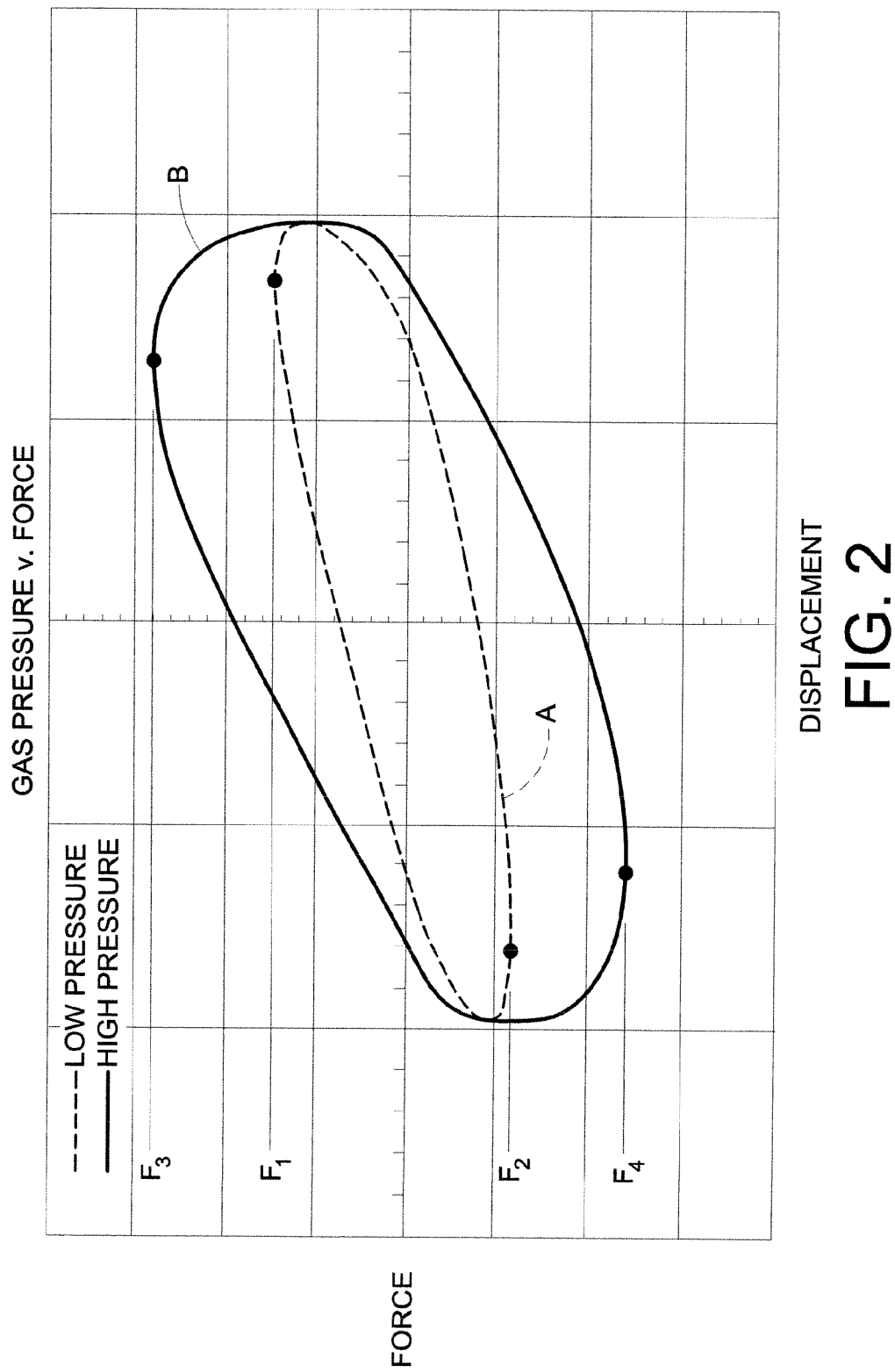
FIG. 2 is a graphical representation of gas pressure versus force.

FIG. 2 graphically represents the damping performance generated by a conventional gas spring and gas damper and the anticipated performance of a gas spring and gas damper assembly in accordance with the subject matter of the present disclosure. More specifically, FIG. 2 illustrates variations in force as a gas spring and gas damper assembly is displaced and the gas damper piston thereof undergoes displacement within a damping chamber. In the present exemplary arrangement, inner spring chambers 124 and 124A operate as such a damping chamber of gas spring and gas damper assembly 100.

Plot A of FIG. 2 represents the expected performance of a conventional gas spring and gas damper assembly and includes peak force values, which are represented in FIG. 2 by reference characters $F_1$ and $F_2$. Plot B of FIG. 2 represents the expected performance of a gas spring and gas damper assembly in accordance with the subject matter of the present disclosure, such as assembly 100, for example. Plot B includes peak force values, which are represented in FIG. 2 by reference characters $F_3$ and $F_4$, that are substantially increased over corresponding peak values $F_1$ and $F_2$ of Plot A. As one exemplary estimate, it is expected that an increase in force within a range of from about 100 percent to about 200 percent can be obtained through the use of a gas spring and gas damper assembly in accordance with the subject matter of the present disclosure in comparison with a similarly sized gas spring and gas damper assembly of a known construction.

Generally, a gas spring and gas damper assembly of a known construction will operate at relatively-low nominal operating pressures, such as at nominal pressures within a range of from about 60 psi to about 120 psi, for example. Thus, the damping performance of such known gas spring and gas damper assemblies is limited by this relatively-low nominal operating pressure. A gas spring and gas damper assembly in accordance with the subject matter of the present disclosure, however, is expected to include a damping chamber that will operate at substantially-higher nominal operating pressures, such as at nominal pressures within a range of from about 200 psi to about 350 psi, for example. Thus, the aforementioned increase in damping performance is expected to result for the subject gas spring and gas damper construction.

In an installed condition and during use, a gas spring and gas damper assembly in accordance with the subject matter of the present disclosure, such as assembly 100, for example, will include one spring chamber operating at a first nominal gas pressure and a second spring chamber operating at a second nominal spring chamber that is lower than the first nominal spring chamber. For example, inner spring chambers 124 and 124A of gas spring and gas damper assembly 100 can operate at a first nominal gas pressure $P_1$, such as a nominal gas pressure within a range of from approximately 200 psi to approximately 350 psi, for example. Outer spring chamber 126 can operate at a second nominal gas pressure $P_2$, such as a nominal gas pressure within a range of from approximately 60 psi to approximately 175 psi, for example.

It will be appreciated that operation of a conventional flexible wall of a gas spring assembly at nominal pressures of greater than about 175 psi may result in decreased performance of the gas spring assembly and, as such, that operation of conventional gas spring assemblies at such pressure levels is generally avoided. It will be recognized, however, that outer spring chamber 126 of the subject gas spring and gas damper assembly surrounds and substantially encapsulates inner flexible wall 112. As such, inner flexible wall 112 is only subjected to the differential pressure (i.e., according to a relationship in which $DP=P_1-P_2$) between nominal operating pressure $P_1$ of inner spring chambers 124 and 124A and nominal operating pressure $P_2$ of outer spring chamber 126. By selectively inflating the inner and outer spring chambers to maintain the differential pressure within a predetermined range, any decrease in performance of inner flexible wall 112 due to the increased pressure in the inner spring chambers can be minimized while providing increased damping performance due to the substantially increased pressure within the damping chamber (i.e., within inner spring chambers 124 and 124A).

The selective inflation and maintenance of the desired differential pressure can be provided in any suitable manner. As one example, inner spring chambers 124 and 124A can be selectively filled and/or vented by way of passage 132 and outer spring chamber 126 can be selectively filled and/or vented by way of passage 136. Such selective transfer of pressurized gas can be cooperatively performed by a suitable pressurized gas system and/or control device. As another example, a passage can be provided between the inner and outer spring chambers that is operative permit fluid flow therethrough and thereby alter the gas pressure in one chamber as the gas pressure in the other chamber varies. In the exemplary arrangement shown, a passage 162 extends through side wall 106 of second end member 104. Additionally, a flow control device, such as a valve, for example, can optionally be provided for selectively controlling gas flow through passage 162. A schematic representation of such a valve is illustrated in FIG. 1 and is identified by reference number 164. Such a flow control device, if provided, can be of any suitable type and/or kind, such as a pressure release valve and/or a proportional flow valve, for example.

Figure 3:
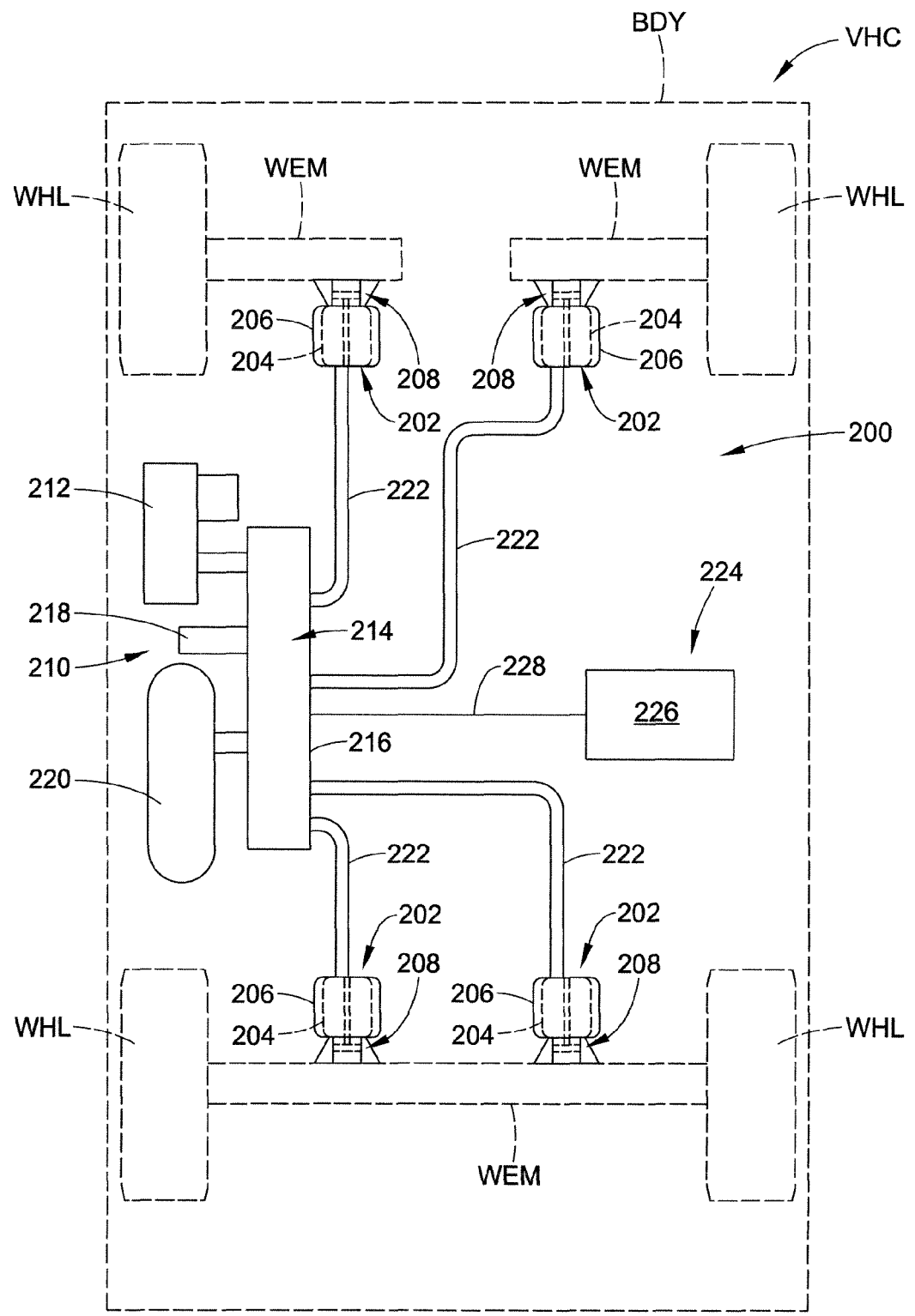
FIG. 3 is a schematic representation of one example of a suspension system utilizing a gas spring and gas damper assembly in accordance with the subject matter of the present disclosure.

It will also be appreciated that a gas spring and gas damper assembly in accordance with the subject matter of the present disclosure, such as assembly 100, or example, can be adapted for use in any application and/or operating environment in which a spring device and damping device are operated in parallel with one another. One example of such an application and use is in association with vehicle seat suspensions, such as may be used in heavy-duty vehicle cabs, tractor-trailer cabs and farm equipment cabs, for example. Another example of a suitable application and use is in operative association with a vehicle suspension system. One exemplary arrangement of a vehicle suspension system that includes a plurality of gas spring and gas damper assemblies in accordance with the subject matter of the present disclosure is shown in FIG. 3 and identified by item number 200. Suspension system 200 is shown as being disposed between a sprung mass, such as an associated vehicle body BDY, for example, and an unsprung mass, such as an associated wheel WHL or an associated wheel-engaging member WEM, for example, of an associated vehicle VHC. It will be appreciated that any such suspension system can include any number of one or more systems, components and/or devices and that the same can be operatively connected between the sprung and unsprung masses of the associated vehicle in any suitable manner.

Suspension system 200 is shown as including a plurality of gas spring and gas damper assemblies that are supported between the sprung and unsprung masses of the associated vehicle. In the embodiment shown in FIG. 1, suspension system 200 includes four gas spring and gas damper assemblies 202, one of which is disposed toward each corner of the associated vehicle adjacent a corresponding wheel WHL. However, it will be appreciated that any other suitable number of gas spring and gas damper assemblies could alternately be used in any other suitable configuration or arrangement.

As shown in FIG. 3, gas spring and gas damper assemblies 202 are supported between wheel-engaging members WEM and body BDY of associated vehicle VHC. As discussed in detail herebefore, gas spring and gas damper assemblies 202 include first and second flexible walls 204 and 206 as well as a gas damper portion 208. As discussed above, it will be recognized that the gas spring and gas damper assemblies shown and described herein (e.g., gas spring and gas damper assemblies 100 and 202) are of a rolling lobe-type construction. However, it will be appreciated that the present novel concept can be utilized in association with gas spring and gas damper assembly arrangements and/or construction of any other suitable type and/or construction.

Suspension system 200 also includes a pressurized gas supply system 210 that is operatively associated with the gas spring and gas damper assemblies for selectively supplying pressurized gas (e.g., air) thereto and selectively transferring pressurized gas therefrom. In the exemplary embodiment shown in FIG. 3, gas supply system 210 includes a pressurized gas source, such as a compressor 212, for example, for generating pressurized air or other gases. The gas supply system can also include any number of one or more control devices of any suitable type, kind and/or construction as may be capable of effecting the selective transfer of pressurized gas. For example, a valve assembly 214 is shown as being in communication with compressor 212 and can be of any suitable configuration or arrangement. In the exemplary embodiment shown, valve assembly 214 includes a valve block 216 with a plurality of valves (not shown) supported thereon. Valve assembly 214 can also optionally include a suitable exhaust, such as a muffler 218, for example, for venting pressurized gas from the system. Optionally, pressurized gas supply system 210 can also include a reservoir 220 in fluid communication with valve assembly 214 and suitable for storing pressurized gas.

The one or more control devices, such as valve assembly 214, for example, can be in communication with gas spring and gas damper assemblies 202 in any suitable manner, such as, for example, through suitable gas transmission lines 222. As such, pressurized gas can be selectively transmitted to and/or from the gas spring and gas damper assemblies through valve assembly 214, such as to alter or maintain vehicle height at one or more corners of the vehicle, for example.

Suspension system 200 also includes a control system 224 that is capable of communication with any one or more other systems and/or components (not shown) of suspension system 200 and/or of which VHC for selective operation and control of the suspension system. Control system 224 includes a controller or electronic control unit (ECU) 226 in communication with compressor 212 and/or valve assembly 214, such as through a conductor or lead 228, for example, for selective operation and control thereof, including supplying and exhausting pressurized fluid to and from gas spring and gas damper assemblies 202. Controller 226 can be of any suitable type, kind and/or configuration.

Control system 224 can also optionally include one or more height or distance sensing devices (not shown) as well as any other desired systems and/or components (e.g., pressure sensors and accelerometers). Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring and gas damper assembly comprising:
   a first end member;
   a second end member disposed in longitudinally-spaced relation to said first end member, said second end member including an inner side wall and an outer side wall, said inner side wall at least partially defining an inner cavity;
   a gas damper piston at least partially received within said inner cavity, said gas damper piston slidably engaging said inner side wall and adapted for longitudinal displacement therealong;
   a gas damper connector rod operatively connecting said first end member and said gas damper piston such that relative longitudinal displacement between said first end member and said second end member results in displacement of said gas damper piston along said inner side wall within said inner cavity;
   a first flexible sleeve operatively connected between said first end member and said second end member at least partially defining a first spring chamber therebetween, said first spring chamber including said inner cavity and at least partially containing said gas damper piston and said gas damper connector rod;
   a second flexible sleeve disposed radially-outwardly along said first flexible sleeve and operatively connected between said first end member and said second end member such that a second spring chamber is formed radially-outwardly of said first spring chamber along said first flexible sleeve; and,
   a passage in fluid communication between said first spring chamber and said second spring chamber and a valve operatively connected in fluid communication along said passage.

2. A gas spring and gas damper assembly according to claim 1, wherein said valve is a proportional pressure valve operative to selectively permit pressurized gas flow from said first spring chamber to said second spring chamber.

3. A gas spring and gas damper according to claim 1, wherein said gas damper piston is adapted to form a substantially fluid-tight seal with said inner side wall of said second end member, and said gas damper piston includes at least one passage extending therethrough that is operative to permit gas flow through said gas damper piston during displacement of said gas damper piston along said inner side wall.

4. A gas spring and gas damper assembly according to claim 3, wherein said gas damper piston includes a valve disposed in operatively communication along said passage.

5. A gas spring and damper assembly according to claim 4, wherein said valve is a first valve disposed along said gas damper piston for operation under movement of said gas damper piston in a first longitudinal direction, and said gas damper piston includes a second valve for operation under movement of said gas damper in an opposing, second longitudinal direction.

6. A gas spring and gas damper assembly according to claim 1, wherein said first spring chamber includes a quantity of gas having a first nominal pressure and said second spring chamber is includes a quantity of gas having a second nominal pressure within a range of from approximately 25 percent of said first nominal pressure to approximately 75 percent of said first nominal pressure.

7. A gas spring and damper assembly according to claim 6, wherein said first nominal pressure is within a range of from approximately 200 psi to approximately 350 psi.

8. A gas spring and gas damper assembly according to claim 6, wherein said second nominal pressure is within a range of from approximately 60 psi to approximately 175 psi.

9. A gas spring and gas damper assembly according to claim 6, wherein said second nominal pressure is within a range of from approximately 40 percent of said first nominal pressure to approximately 60 percent of said first nominal pressure.

10. A gas spring and gas damper assembly according to claim 1, wherein said inner side wall is substantially cylindrical, and said outer side wall is at least one of substantially cylindrical, frustoconical or curvilinear.

11. A suspension system comprising:
a gas spring and gas damper assembly according to claim 1; and,
a pressurized gas system including a pressurized gas source in fluid communication with at least one of said first and second spring chambers of said gas spring and gas damper assembly.

12. A suspension system according to claim 11, wherein said gas spring and gas damper assembly is one of a plurality of gas spring and gas damper assemblies in fluid communication with said pressurized gas source.

13. A method of operating a gas spring and gas damper assembly, said method comprising:
a) providing a first end member and a second end member with said first end member including a side wall at least partially defining an end member cavity;
b) forming a gas damper from a damper piston received within said end member cavity by operatively connecting said damper piston to said second end member such that relative displacement of said first end member and said second end member results in displacement of said damper piston within said end member cavity along said first side wall;
c) forming a first spring chamber about said gas damper from a first flexible wall secured along said first end member and said second end member and pressurizing said first spring chamber to a first nominal pressure;
d) forming a second spring chamber that encapsulates said first flexible wall from a second flexible wall secured along said first end member and said second end member and pressurizing said second spring chamber to a second nominal pressure that is at least 25 percent less than said first nominal pressure;
e) forming a passage in fluid communication between said first spring chamber and said second spring chamber; and,
f) operatively connecting a valve in fluid communication along said passage.

14. A method according to claim 13, wherein pressurizing said first spring chamber in c) includes pressurizing said first spring chamber to a pressure within a range of approximately 200 psi to approximately 350 psi, and pressurizing said second chamber in d) includes pressuring said second spring chamber to a pressure within a range of approximately 60 psi to approximately 175 psi.

15. A method according to claim 13, wherein said second nominal pressure of said second spring chamber is within a range of from approximately 25 percent less than said first nominal pressure to approximately 75 percent less than said first nominal pressure.

16. A method according to claim 13, wherein said second nominal pressure is within a range of from approximately 40 percent less than said first nominal pressure to approximately 60 percent less than said first nominal pressure.

17. A method according to claim 13, wherein said valve is a proportional pressure valve operative to selectively permit pressurized gas flow from said first spring chamber to said second spring chamber.

18. A method according to claim 13, wherein said second flexible wall is disposed radially-outwardly along said first flexible wall such that said second spring chamber is formed radially-outwardly of said first spring chamber along said first flexible wall.

* * * * *